United States Patent [19]

Kmiecik-Lawrynowicz et al.

[11] Patent Number: 5,514,763
[45] Date of Patent: May 7, 1996

[54] STYRENE/BUTADIENE TONER RESINS WITH EXCELLENT GLOSS AND FIX PROPERTIES

[75] Inventors: Grazyna E. Kmiecik-Lawrynowicz; T. Brian McAneney, both of Burlington; Raj D. Patel, Oakville; Michael A. Hopper, Toronto; David J. Sanders, Oakville, all of Canada

[73] Assignee: Xerox Corporation, Stamford, Conn.

[21] Appl. No.: 312,196

[22] Filed: Sep. 26, 1994

[51] Int. Cl.⁶ .................. C08F 236/06; C08F 212/08; G03G 9/08; G03G 9/09
[52] U.S. Cl. .................. 526/340; 430/106; 430/106.6; 430/109; 430/110; 526/317.1; 526/340.1; 526/347; 526/348.6
[58] Field of Search .................. 526/340, 340.1, 526/347; 430/135, 137, 106, 106.6, 110, 109

[56] References Cited

U.S. PATENT DOCUMENTS

| | | | |
|---|---|---|---|
| 4,469,770 | 9/1984 | Nelson | 430/110 |
| 4,959,419 | 9/1990 | Schmidt | 525/301 |
| 5,166,028 | 11/1992 | Paine et al. | |
| 5,344,738 | 9/1994 | Kmiecik-Lawrynowicz et al. | |
| 5,346,797 | 9/1994 | Kmiecik-Lawrynowicz | 430/137 |

Primary Examiner—Fred Zitomer
Attorney, Agent, or Firm—Oliff & Berridge; Eugene O. Palazzo

[57] ABSTRACT

A toner composition includes a styrene/butadiene resin having a weight average molecular weight of less than about 70,000 and a number average molecular weight of from about 8,000 to about 12,000, has a glass transition temperature of from about 50° C. to about 60° C. and provides excellent gloss and high fix properties at a low fusing temperature. The styrene/butadiene resin is produced by an emulsion polymerization process that includes forming an emulsion of a surfactant, styrene monomer, butadiene monomer and a water-soluble monomer in water, and then polymerizing the monomers in the presence of a water-soluble initiator.

23 Claims, No Drawings

STYRENE/BUTADIENE TONER RESINS WITH EXCELLENT GLOSS AND FIX PROPERTIES

BACKGROUND OF THE INVENTION

This invention relates to an improved resin composition and more particularly to an improved styrene/butadiene resin composition useful for making electrostatographic toner compositions.

Styrene/butadiene resins are known in the art. For example, U.S. Pat. Nos. 5,166,028 and 4,469,770 describe styrene butadiene copolymers, methods for their manufacture, and their use in toners and developers.

Styrene/butadiene resins may be produced by a variety of different methods. For example, U.S. Pat. No. 5,166,028 discloses a dispersion polymerization process for producing such resins. The resin is prepared by dispersion polymerizing a homogeneous organic or aqueous/organic mixture comprising one or more solvents, one or more stearic stabilizers such as poly(vinylpyrrolidone), one or more initiators, styrene monomer, butadiene monomer and a surfactant. However, the known dispersion polyermization processes have several disadvantages in the production of styrene/butadiene toner resins. For example, the dispersion polymerization process requires the use of one or more solvents, which must be removed from the reaction medium and the product particles after polymerization has completed. However, not all of the solvent may be removed from the particles, and even the small amounts of solvent that remain can affect the resin particle properties. In addition to solvent, the resin particles also include amounts of the stearic stabilizer, such as poly(vinylpyrrolidone), which may also affect the particle properties. Additionally, it is more difficult in the dispersion polymerization process to control the molecular weight distribution.

U.S. Pat. No. 4,469,770 also describes an emulsion polymerization process for producing styrene/butadiene resins. Emulsion polymerization is a well-known industrial process. Emulsion polymerization generally comprises forming an emulsion of a surfactant and the monomer in water, then polymerizing the monomer in the presence of a water soluble initiator. Generally, however, the emulsion polymerization process is used to make very high molecular weight polymers (e.g., 100,000 to several million) with a low molecular weight distribution (e.g., 2 to 4). The molecular weight is very high because the particles are so small that they encounter initiator very rarely. Furthermore, the high interior viscosity promotes a gel effect, whereby the growing chains have difficulty terminating because the radicals cannot move toward each other before growing to great length. Chain transfer agents can be used to decrease the molecular weight, but added chain transfer agent also greatly increases the molecular weight distribution.

Experimentation in the art of toner resin production has focused upon narrow molecular weight regions with narrow molecular weight distributions, as those two variables greatly affect the gloss and fix properties of a toner resin. In many cases a trade-off is necessary between the gloss and fix properties of the toner, and such a trade-off usually results in an increase in the fusing temperature. For example, a toner designed with high gloss properties often has poor fix behavior. Either the toner is too brittle and has poor mechanical properties or the particles are not well coalesced to each other and thus do not adhere well to the paper. In other cases, the fix properties of the toner may be very good, but only at the expense of the gloss properties. Efforts to improve both the gloss and the fix properties of toner resins have been undertaken, but have met minimal success.

A toner exists that utilizes a styrene/butadiene latex available as Pliotone from the Goodyear Tire and Rubber Company. This resin has a number average molecular weight ($M_n$) of about 13,900, a weight average molecular weight ($M_w$) of about 97,500, a molecular weight distribution (MWD) of about 7 and a glass transition temperature ($T_g$) of about 60.3° C. However, the resin has a problem with gloss properties and projection efficiency, and requires a higher fusing temperature to produce acceptable toner results.

A significant improvement in gloss and fix properties should be obtainable by modifying the toner resin composition. For example, a fraction of projection is lost due to the rough surface of the fused toner image. This rough surface is believed to be due to the poor melt properties of the toner.

SUMMARY OF THE INVENTION

A need continues to exist for improved toner resin compositions, particularly those that provide excellent gloss and high fix properties at a low fusing temperature. We have discovered that a toner resin with a $M_w$ much lower than that of the known toner resins provides such excellent gloss and high fix properties while reducing the fusing temperatures. Such an improved toner resin composition is provided in this invention.

Specifically, this invention provides a toner resin composition comprising a styrene/butadiene resin composition wherein said resin has a weight average molecular weight of less than about 70,000, a number average molecular weight of from about 8,000 to about 12,000, a glass transition temperature of from about 50° C. to about 60° C., and produced by an emulsion polymerization process, said process comprising forming an emulsion of a surfactant, styrene monomer and butadiene monomer in water, then polymerizing the styrene monomer and butadiene monomer in the presence of a water-soluble initiator.

The resin compositions of the present invention are particularly useful in toners for use in electrostatographic imaging systems. The resins of the present invention provide both high gloss properties and good fix properties while maintaining a low fusing temperature.

DETAILED DESCRIPTION OF PREFERRED EMBODIMENTS

The resin of the present invention is prepared by emulsion polymerizing styrene and butadiene monomers.

The resins of the present invention are characterized by specific physical properties. Specifically, the resins of the present invention possess a number average molecular weight ($M_n$), weight average molecular weight ($M_w$), and thus a molecular weight distribution (MWD), and a glass transition temperature ($T_g$), all of which affect the gloss and fusing properties of the resin. These properties will now be discussed in more detail.

Significantly reducing the weight average molecular weight of the conventional styrene/butadiene resin results in unexpected improvements in the gloss and fusing properties of toners prepared from that resin. If the $M_w$ is too low, of course, the resin may be too brittle and possess poor mechanical properties. If the $M_w$ is too high, the particles may not coalesce to each other or adhere well to the paper, or the resin may flow at a temperature which is too high for conventional applications. A resin having a Mw within the range of about 10,000 to about 70,000 yields a toner that provides a smooth glossy image for high gloss properties, and that also flows at a reasonable temperature. Preferably, the Mw of the resin of the present invention should be within the range of from about 10,000 to about 70,000; preferably in the range of from about 20,000 to about 70,000; and more preferably in the range of from about 25,000 to about 60,000. As an example, a resin with Mw of 53,200 was found to produce a toner with excellent fix and gloss properties.

The resins of the present invention have an appropriate Mn below about 12,000. Lowering the Mn of the resin to below about 12,000 achieves better gloss and fusing properties, while also lowering the glass transition temperature (Tg). Thus, because the Tg greatly affects the fusing properties of the toner resin, and because Mn in turn largely determines the Tg, it is necessary in achieving the goals of the present invention to control the Mn of the resin. Preferably, the Mn of the resin of the present invention should be in the range of from about 8,000 to about 12,000, and more preferably in the range of from about 9,000 to about 11,000. As an example, a resin with Mn of 9,100 was found to produce a toner with excellent fix, gloss and Tg properties.

Preferably, the toner resins of the present invention have a MWD in the range of from about 2 to about 12; and more preferably the MWD is within the range of from about 2.5 to about 6.

The above discussion describes the resins of the present invention in terms of the Mn, Mw and MWD values of the resins. However, the three values are related by the formula MWD=Mw/Mn. Therefore, if any two values are known, the third value can be readily determined.

To facilitate the use of the resins of the present invention in an electrostatographic toner, the resin should have a relatively low glass transition temperature (Tg). Preferred embodiments of the resins of the present invention have a Tg in the range of from about 50° C. to about 60° C. More preferably, the Tg of the resins is in the range of from about 52° C. to about 58° C.

The styrene component is present in the resin in a range of from about 75% to about 95% by weight. More preferably, the styrene component is present in the resin in a range of from about 85% to about 90% by weight.

The butadiene component is present in the resin in a range of from about 5% to about 25% by weight. More preferably, the butadiene component is present in the resin in a range of from about 10% to about 15% by weight.

As an example, excellent gloss, fix and fusing temperature properties have been achieved using a resin of the present invention containing about 88% styrene and about 12% butadiene.

Preferably, the styrene/butadiene resins of the present invention are produced using an emulsion polymerization process. Such a process is described, for example, in U.S. Pat. No. 4,469,770, the entire disclosure of which is incorporated herein by reference. Additionally, the styrene/butadiene resins of the present invention may be produced by a starve fed emulsion polymerization process, such as that described in U.S. Pat. No. 5,444,140, the entire disclosure of which is incorporated herein by reference. An advantage of the emulsion polymerization process is the low residual monomer that may be achieved under favorable circumstances, such as from 50 to 1000 ppm due to the high conversion.

Generally, the emulsion polymerization process comprises forming an emulsion of a surfactant and monomer(s) in water, then polymerizing the monomer(s) in the presence of a water soluble initiator. A chain transfer agent may also be added during the polymerization process, to decrease the molecular weight of the resultant polymer to the desired value. Suitable surfactants, initiators, and chain transfer agents for use in the emulsion polymerization process are described in the above-incorporated U.S. Pat. No. 5,444,140.

It is also advantageous in the polymerization process of the present invention to add a water soluble monomer such as acrylic or methacrylic acid, in an amount of from about 0.01 to about 10% by weight of monomer(s), and preferably from about 0.1 to about 3%. Small amounts of water soluble monomers impart additional latex stability in emulsion polymerization processes.

The resins of the present invention may be incorporated into toners, inks and developers by known methods.

The resins are generally present in the toner of the invention in an amount of from about 40% to about 98% by weight, and more preferably from about 70% to about 98% by weight, although they may be present in greater or lesser amounts, provided that the objectives of the invention are achieved. For example, toner resins of the invention can be subsequently melt blended or otherwise mixed with a colorant, charge carrier additives, surfactants, emulsifiers, pigment dispersants, flow additives, and the like. The resultant product can then be pulverized by known methods such as milling to form toner particles. The toner resin may also be aggregated and coalesced into toner-sized particles by aggregating the resin with a solution of a colorant, charge carrier additives, surfactants, pigment dispersants, flow additives, and the like, as described, for example, in U.S. Pat. Nos. 5,344,738 and 5,346,797 the entire disclosures of which are incorporated herein by reference. The toner particles preferably have an average volume particle diameter of about 5 microns to about 25 microns, and more preferably about 5 microns to about 15 microns.

Various suitable colorants can be employed in toners of the invention, including suitable colored pigments, dyes, and mixtures thereof including Carbon Black, such as Regal 330® carbon black (Cabot), Acetylene Black, Lamp Black, Aniline Black, Chrome Yellow, Zinc Yellow, Sicofast Yellow, Luna Yellow, Novaperm Yellow, Chrome Orange, Bayplast Orange, Cadmium Red, Lithol Scarlet, Hostaperm Red, Fanal Pink, Hostaperm Pink, Lithol Red, Rhodamine Lake B, Brilliant Carmine, Heliogen Blue, Hostaperm Blue, Neopan Blue, PV Fast Blue, Cinquassi Green, Hostaperm Green, titanium dioxide, cobalt, nickel, iron powder, Sicopur 4068 FF, and iron oxides such as Mapico Black (Columbia), NP608 and NP604 (Northern Pigment), Bayferrox 8610 (Bayer), MO8699 (Mobay), TMB-100 (Magnox), mixtures thereof and the like.

The colorant, preferably carbon black, cyan, magenta and/or yellow colorant, is incorporated in an amount sufficient to impart the desired color to the toner. In general, pigment or dye is employed in an amount ranging from about 2% to about 60% by weight, and preferably from about 2% to about 7% by weight for color toner and about 5% to about 60% by weight for black toner.

Various known suitable effective positive or negative charge enhancing additives can be selected for incorporation into the toner compositions of the present invention, preferably in an amount of about 0.1% to about 10% by weight, and more preferably about 1% to about 3% by weight. Examples include quaternary ammonium compounds inclusive of alkyl pyridinium halides; alkyl pyridinium compounds, such as those disclosed in U.S. Pat. No. 4,298,672, the disclosure of which is totally incorporated herein by reference; organic sulfate and sulfonate compositions, such as those disclosed in U.S. Pat. No. 4,338,390, the disclosure of which is totally incorporated herein by reference; cetyl pyridinium tetrafluoroborates; distearyl dimethyl ammonium methyl sulfate; aluminum salts such as Bontron E84™ or E88™ (Hodogaya Chemical); and the like.

Additionally, other internal and/or external additives may be added in known amounts for their known functions.

The resulting toner particles optionally can be formulated into a developer composition by mixing with carrier particles. Illustrative examples of carrier particles that can be selected for mixing with the toner composition prepared in accordance with the present invention include those particles that are capable of triboelectrically obtaining a charge of opposite polarity to that of the toner particles. Accordingly, in one embodiment the carrier particles may be selected so as to be of a negative polarity in order that the toner particles which are positively charged will adhere to and surround the carrier particles. Illustrative examples of such carrier particles include granular zircon, granular silicon, glass, steel, nickel, iron ferrites, silicon dioxide, and the like. Additionally, there can be selected as carrier particles nickel berry carriers as disclosed in U.S. Pat. No. 3,847,604, the entire disclosure of which is totally incorporated herein by reference, comprised of nodular carrier beads of nickel, characterized by surfaces of reoccurring recesses and protrusions thereby providing particles with a relatively large external area. Other carriers are disclosed in U.S. Pat. Nos. 4,937,166 and 4,935,326, the disclosures of which are totally incorporated herein by reference.

The selected carrier particles can be used with or without a coating, the coating generally being comprised of fluoropolymers, such as polyvinylidene fluoride resins, terpolymers of styrene, methyl methacrylate, and a silane, such as triethoxy silane, tetrafluoroethylenes, other known coatings and the like.

The diameter of the carrier particles is generally from about 50 microns to about 1,000 microns, preferably about 200 microns, thus allowing these particles to possess sufficient density and inertia to avoid adherence to the electrostatic images during the development process. The carrier particles can be mixed with the toner particles in various suitable combinations. However, best results are obtained when about 1 part carrier to about 10 parts to about 200 parts by weight of toner are mixed.

Toners of the invention can be used in known electrostatographic imaging methods, although the fusing energy requirements of some of those methods can be reduced in view of the advantageous fusing properties of the toner of the invention as discussed herein. Thus for example, the toners or developers of the invention can be charged, e.g., triboelectrically, and applied to an oppositely charged latent image on an imaging member such as a photoreceptor or ionographic receiver. The resultant toner image can then be transferred, either directly or via an intermediate transport member, to a support such as paper or a transparency sheet. The toner image can then be fused to the support by application of heat and/or pressure, for example with a heated fuser roll.

Toners incorporating resins of the present invention have characteristic fusing temperatures that are required to reach levels of 40, 50 and 60 gloss units (GU) and a crease area of 65. These values are denoted $T_{G40}$, $T_{G50}$, $T_{G60}$ and $T_{C65}$, respectively. Preferably, toners of the present invention have $T_{G40}$, $T_{G50}$ and $T_{G60}$ values all below about 200° C. $T_{G40}$ is preferably below about 180° C., and more preferably below about 170° C. $T_{G50}$ is preferably below about 190° C., and more preferably below about 180° C. $T_{G60}$ is preferably below about 200° C., and more preferably below about 190° C. As an example, good results were obtained with a toner having $T_{G40}$ of 166° C., $T_{G50}$ of 174° C. and $T_{G60}$ of 182° C.

Preferably, toners of the present invention have a $T_{C65}$ value below about 190° C. $T_{G65}$ is more preferably below about 170° C., and even more preferably below about 160° C. As an example, good results were obtained with a toner having $T_{G65}$ of 142° C.

One skilled in the art will recognize that the above resin characteristics and monomer ratios may be adjusted as necessary to achieve a resin with specific characteristics. The following examples illustrate specific embodiments of this invention, but do not limit the scope of the present invention. Parts and percentages are by weight unless otherwise indicated.

EXAMPLES

Example 1

The resin is prepared in a conventional emulsion polymerization process as follows. An aqueous phase comprising 130.5 g of Neogen R™ anionic surfactant, 124.7 g of Antarox CA897™ nonionic surfactant, and 8.7 kg of deionized water is charged into a 5 gallon stainless steel reactor and agitated at 200 rpm for 60 mins. 58 g of potassium persulfate is then added to the reactor. An organic phase comprising 5104 g of styrene, 145 g of dodecanethiol (a chain transfer agent), and 116 g of acrylic acid is charged into a monomer tank to which 696 g of butadiene is introduced under pressure. The organic phase consisting of styrene/butadiene/acrylic acid (88/12/2 pph) is then transferred into the reactor under a pressure of 300 kPa and an initial temperature of 28.6° C. As the organic phase is mixed into the aqueous phase under agitation, an emulsion is formed that is polymerized at 80° C. for a period of 8 hours. The reactor is then cooled down and the product is discharged into a 5 gallon pail.

The Mw, Mn and MWD of the resin thus produced are measured using gel permeation chromatography. The resin is found to have a Mw of 53,200, Mn of 9,100, and a MWD of 5.87. The resin also has a Tg of 55.0° C.

The resin is then incorporated into a toner by aggregation of the resin with pigment particles. Specifically, the toner is produced by taking 650 g of the above latex and simultaneously adding it with a pigment solution consisting of 18 g of predispersed pigment (BHD 6000™), 600 g of water and 5.85 g of cationic surfactant (Sanizol B™), to 1000 g of water while being polytroned. The mixture is recirculated through a shearing device running at a speed of 10,000 rpm at a gap setting of 2 mm for 8 mins to build up the viscosity of the mixture. At the end of the shearing process, the mixture is transferred into a 4 liter reactor equipped with a stirrer and agitated at 500 rpm. The aggregation is performed by raising the reactor temperature to 45° C. for 3 hrs to obtain a particle size of 4.0 micron with a GSD (geometric size distribution) of 1.22. The temperature is then further raised to 80° C. for a period of 6 hrs. The particle size obtained is 8.2 micron with a GSD of 1.20. The toner has a Mw of 56,200, Mn of 10,100, and MWD of 5.54 and a Tg of 52.4° C.

The toner is fused on a fusing fixture at different fusing temperatures. Measurements are made of toner gloss, fix (by crease), and fusing latitude. These measurements are presented in Table I.

Example 2

The resin is prepared as in Example 1, by emulsion polymerization. The latex, which is 40% solids, is then taken and freeze dried by freezing the latex for a period of 1 hr, followed by overnight drying. Due to the small size of the latex particles it is very difficult to remove the surfactants and hence the latex is dried as is.

The resin is then incorporated into a toner by conventional melt mixing and jetting. Specifically, the dry latex (powder) is melt blended with P.V. Fast Blue pigment using a Haake mixer operating at a speed of 100 rpm, and a temperature of 140° C. for 15 mins. The pigmented strands are then fitzmilled through a 450 micron screen, followed by micronization with a 2 inch micronizer for further reduction of particle size.

The Mw, Mn and MWD of the toner thus produced are measured using gel permeation chromatography. The toner is found to have a Mw of 56,500, Mn of 10,700, and a MWD of 5.27. The toner also has a Tg of 52.8° C.

The toner is fused on a fusing fixture as in Example 1, and the same measurements are taken. These measurements are presented in Table I.

Example 3

The resin is prepared in a conventional emulsion polymerization process as follows. An aqueous phase comprising 130.5 g of Neogen R™ anionic surfactant, 124.7 g of Antarox CA897™ nonionic surfactant, and 8.7 kg of deionized water is charged into a 5 gallon stainless steel reactor and agitated at 200 rpm for 60 mins. 58 g of potassium persulfate is then added to the reactor. An organic phase comprising 5104 g of styrene, 145 g of dodecanethiol and 116 g of acrylic acid is charged into a monomer tank to which 696 g of butadiene is introduced under pressure. The organic phase consisting of styrene/butadiene/acrylic acid (88/12/2 pph) is then transferred into the reactor under a pressure of 460 kPa and an initial temperature of 35° C. As the organic phase is mixed into the aqueous phase under agitation, an emulsion is formed that is polymerized at 80° C. for a period of 6 hours. The reactor is then cooled down and the product is discharged into a 5 gallon pail.

The Mw, Mn and MWD of the resin thus produced are measured using gel permeation chromatography. The resin is found to have a Mw of 29,900, Mn of 10,600 and a MWD of 2.81. The resin also has a Tg of 53.4° C.

The resin is then incorporated into a toner by aggregation of the resin with pigment particles. Specifically, the toner is produced by taking 650 g of the above latex and simultaneously adding it with a pigment solution consisting of 18 g of predispersed pigment (BHD 6000™), 600 g of water and 5.85 g of cationic surfactant (Sanizol B™), to 1000 g of water while being polytroned. The mixture is recirculated through a shearing device running at a speed of 10,000 rpm at a gap setting of 2 mm for 8 mins to build up the viscosity of the mixture. At the end of the shearing process, the mixture is transferred into a 4 liter reactor equipped with a stirrer and agitated at 500 rpm. The aggregation is performed by raising the reactor temperature to 45° C. for 3 hrs. The particle size obtained is 3.8 micron with a GSD of 1.22. 120 mL of 20% (w/w) of aqueous anionic surfactant solution is added in order to retain the aggregate particle size through the remainder of the process. The temperature is then further raised to 80° C. for a period of 6 hrs. The particle size thus obtained is 3.5 micron and a GSD of 1.22. The toner has a Mw of 30,800, Mn of 10,100, MWD of 3.06 and a Tg of 56.2° C.

The toner is fused on a fusing fixture as in Example 1, and the same measurements are taken. These measurements are presented in Table I.

Comparative Example 1

For comparison purposes, a conventional toner, using the Goodyear Pliotone styrene/butadiene resin, is selected. The toner is fused on a fusing fixture as in Example 1, and the same measurements are taken. These measurements are presented in Table I.

TABLE I

Toner Properties

| Example # | Mw | Mn | MWD | Tg °C. | Gloss Temperature[1] | | | Gloss $G_{max}$ | Hot Offset Temperature | $T_{C65}$ °C. | Fix Latitude °C. |
| --- | --- | --- | --- | --- | --- | --- | --- | --- | --- | --- | --- |
| | | | | | $T_{G40}$ | $T_{G50}$ | $T_{G60}$ | | | | |
| 1 | 56,200 | 10,100 | 5.54 | 52.4 | 166 | 174 | 182 | 70 | >200 | 142 | >58 |
| 2 | 56,500 | 10,700 | 5.27 | 52.8 | 176 | 182 | 190 | NR[2] | >200 | 168 | >32 |
| 3 | 30,800 | 10,100 | 3.06 | 56.2 | 149 | 156 | 163 | 74 | 190 | 143 | 47 |
| Comp 1 | 97,500 | 13,900 | 6.09 | 60.3 | 210 | NR[2] | NR[2] | NR[2] | >210 | 198 | >12 |

[1]All gloss measurements are made according to TAPPI T480 (75°)
[2]NR means that the value is not reached at the highest fusing temperature (210° C.).
TG40 = Fusing temperature required to reach gloss of 40 GU
TG50 = Fusing temperature required to reach gloss of 50 GU
TG60 = Fusing temperature required to reach gloss of 60 GU
TC65 = Fusing temperature required to reach crease area of 65
Fix Latitude = Hot Offset Temperature - $T_{C65}$

What is claimed is:

1. A toner composition comprising a polymer resin and a colorant, wherein said resin comprises styrene, butadiene, and a water-soluble monomer and has a weight average molecular weight of less than about 70,000, a number average molecular weight of from about 8,000 to about 12,000, and a glass transition temperature of from about 50° C. to about 60° C.

2. A toner composition according to claim 1, wherein said resin has a weight average molecular weight of from about 10,000 to about 70,000.

3. A toner composition according to claim 1, wherein said resin has a weight average molecular weight of from about 25,000 to about 60,000.

4. A toner composition according to claim 1, wherein said resin has a molecular weight distribution of from about 2 to about 12.

5. A toner composition according to claim 1, wherein said resin has a molecular weight distribution of from about 2.5 to about 6.

6. A toner composition according to claim 1, wherein said resin has a glass transition temperature of from about 52° C. to about 58° C.

7. A toner composition according to claim 1, wherein said colorant comprises carbon black.

8. A toner composition according to claim 1, wherein said colorant comprises magnetite.

9. A toner composition according to claim 1, wherein said colorant is selected from the group consisting of cyan, magenta or yellow colorants.

10. A toner composition according to claim 1, further comprising a charge enhancing additive.

11. A toner composition according to claim 1, further comprising a flow enhancing additive.

12. A toner composition according to claim 1, wherein said water-soluble monomer is present in said resin in an amount of from about 0.01 to about 10% by weight of the combined styrene and butadiene.

13. A toner composition according to claim 1, wherein said water-soluble monomer is selected from the group consisting of acrylic acid and methacrylic acid.

14. A styrene/butadiene resin composition, comprising styrene, butadiene, and a water-soluble monomer, wherein said resin has a weight average molecular weight of less than about 70,000, a number average molecular weight of from about 8,000 to about 12,000, and a glass transition temperature of from about 50° C. to about 60° C.

15. A resin according to claim 14, wherein said weight average molecular weight is from about 10,000 to about 70,000.

16. A resin according to claim 14, wherein said weight average molecular weight is from about 25,000 to about 60,000.

17. A resin according to claim 14, wherein said resin has a molecular weight distribution of from about 2 to about 12.

18. A resin according to claim 14, wherein said resin has a molecular weight distribution of from about 2.5 to about 6.

19. A resin according to claim 14, wherein said resin has a glass transition temperature of from about 52° C. to about 58° C.

20. A resin according to claim 14, wherein said water-soluble monomer is selected from the group consisting of acrylic acid and methacrylic acid.

21. A resin according to claim 14, wherein said resin contains from about 85% to about 90% by weight of styrene and from about 10% to about 15% by weight of butadiene.

22. A resin according to claim 14, wherein said water-soluble monomer is present in said resin in an amount of from about 0.01 to about 10% by weight of styrene and butadiene.

23. A resin according to claim 14, wherein said resin contains about 88% by weight of styrene and about 12% by weight of butadiene and about 2 parts by weight of said water-soluble monomer per hundred parts of the combined weight of said styrene and butadiene.

* * * * *